(12) United States Patent
Huang et al.

(10) Patent No.: US 9,772,090 B2
(45) Date of Patent: Sep. 26, 2017

(54) CABLE ASSEMBLY AND MANUFACTURING METHOD OF THE SAME

(71) Applicant: FOXCONN INTERCONNECT TECHNOLOGY LIMITED, Grand Cayman (KY)

(72) Inventors: Shuai-Hui Huang, Kunshan (CN); Ru-Yang Guo, Kunshan (CN); Qing-Man Zhu, Kunshan (CN); Jerry Wu, Irvine, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/472,224

(22) Filed: Mar. 28, 2017

(65) Prior Publication Data

US 2017/0198883 A1   Jul. 13, 2017

Related U.S. Application Data

(63) Continuation-in-part of application No. 15/278,325, filed on Sep. 28, 2016.

(30) Foreign Application Priority Data

Sep. 29, 2015 (CN) .................... 2015 2 0760606 U
Mar. 28, 2016 (CN) ......................... 2016 1 0181056

(51) Int. Cl.
*H01R 3/00* (2006.01)
*F21V 11/00* (2015.01)
(Continued)

(52) U.S. Cl.
CPC ............ *F21V 11/00* (2013.01); *F21V 17/105* (2013.01); *F21V 19/003* (2013.01);
(Continued)

(58) Field of Classification Search
None
See application file for complete search history.

(56) References Cited

U.S. PATENT DOCUMENTS 7,311,526 B2   12/2007   Rohrbach et al.
7,744,231 B2   6/2010   Hutchinson et al.
(Continued)

FOREIGN PATENT DOCUMENTS

CN   205092375   10/2010
CN   103124031   8/2015
CN   102761035   10/2015

*Primary Examiner* — Tho D Ta
(74) *Attorney, Agent, or Firm* — Wei Te Chung; Ming Chieh Chang (57) ABSTRACT

A cable assembly (100) includes an insulative housing (1), a printed circuit board (PCB) (2) received in the insulative housing, a light member (4) mounted on the PCB, a light guide member (5) mounted on the PCB, and a shading member (6) covering the light guide member. The insulative housing includes a housing body (11), a receiving cavity (12) enclosed by the housing body, and a light transmitting area (13) mounted on the housing body. The PCB is mounted in the receiving cavity and the light guide member opposes the light transmitting area to transmit light emitted by the light member to outside of the insulative housing. The light guide member (5) is integrally formed with the shading member (6).

12 Claims, 9 Drawing Sheets

(51) Int. Cl.
  *F21V 8/00*   (2006.01)
  *F21V 19/00*  (2006.01)
  *F21V 17/10*  (2006.01)
  F21Y 115/10   (2016.01)
  H01R 13/504   (2006.01)
  H01R 13/717   (2006.01)

(52) U.S. Cl.
  CPC ......... *G02B 6/0001* (2013.01); *F21Y 2115/10* (2016.08); *H01R 13/504* (2013.01); *H01R 13/7175* (2013.01)

(56) References Cited

U.S. PATENT DOCUMENTS

| | | | |
|---|---|---|---|
| 7,914,320 B2* | 3/2011 | Ko | H01R 13/502 439/490 |
| 8,535,088 B2* | 9/2013 | Gao | H01R 9/03 439/39 |
| 8,790,120 B2 | 7/2014 | Wang et al. | |
| 2013/0034990 A1* | 2/2013 | Warren | H01R 13/7175 439/490 |
| 2013/0210244 A1 | 8/2013 | DiFonzo et al. | |
| 2013/0308304 A1 | 11/2013 | Tuchrelo et al. | |
| 2015/0214677 A1* | 7/2015 | Huang | H01R 13/7175 439/39 |
| 2016/0240984 A1 | 8/2016 | Huang et al. | |

\* cited by examiner

CABLE ASSEMBLY AND MANUFACTURING METHOD OF THE SAME

The instant application is a CIP (continuation-in-part) application of the copending application Ser. No. 15/278,325 filed Sep. 28, 2016.

BACKGROUND OF THE INVENTION

1. Field of the Invention

The present disclosure relates to a cable assembly and manufacturing method of the same for reducing assembly time.

2. Description of Related Arts

The aforementioned parent application discloses a cable assembly. The cable assembly includes an insulative housing with a receiving cavity, a light member mounted on one side of the insulative housing, a light guide member transmitting light from the light member, and a shading member covered the light member and light guide member. Notably, the light guide member, the shading member and the front plug are required to be commonly assembled together to securely retain the light guide member in position with regard to the light member, thus increasing assembling time and labor cost.

An improved cable assembly is desired.

SUMMARY OF THE INVENTION

Accordingly, an object of the present invention is to provide a cable assembly for reducing assembly time.

To achieve the above object, a cable assembly comprises: an insulative housing including a housing body, a receiving cavity enclosed by the housing body, and a light transmitting area disposed on the housing body; a printed circuit board (PCB) received in the insulative housing and mounted in the receiving cavity; a light member mounted on the PCB; a light guide member closely position upon the PCB, the light guide member opposing the light transmitting area for transmitting light emitted by the light member to outside of the insulative housing; and a shading member covering the light guide member, wherein the shading member independently retains the light guide member in position.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention. Referring to FIGS. 1 to 9, a cable assembly 100 includes an insulative housing 1, a printed circuit board (PCB) 2 received in the insulative housing 1, a mating member 3 electrically connected with PCB 2, a light member 4 mounted on the PCB 2, magnetic elements 9 and a light guide member 5 mounted on the PCB 2, a shading/retaining member 6 covered on the light guide member 5, a front plug 7 held in light guide member 5, and a cable 8.

Figure 1:
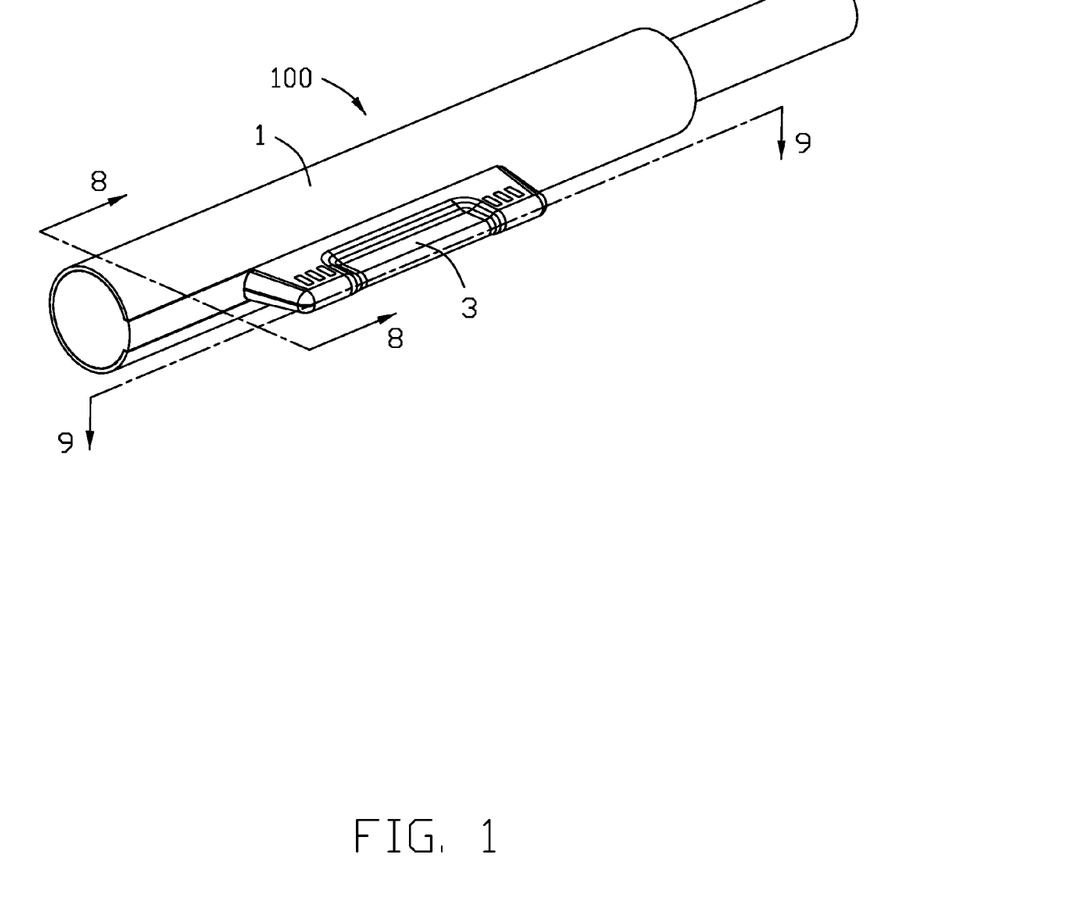
FIG. 1 is a perspective view of a cable assembly.
Figure 2:
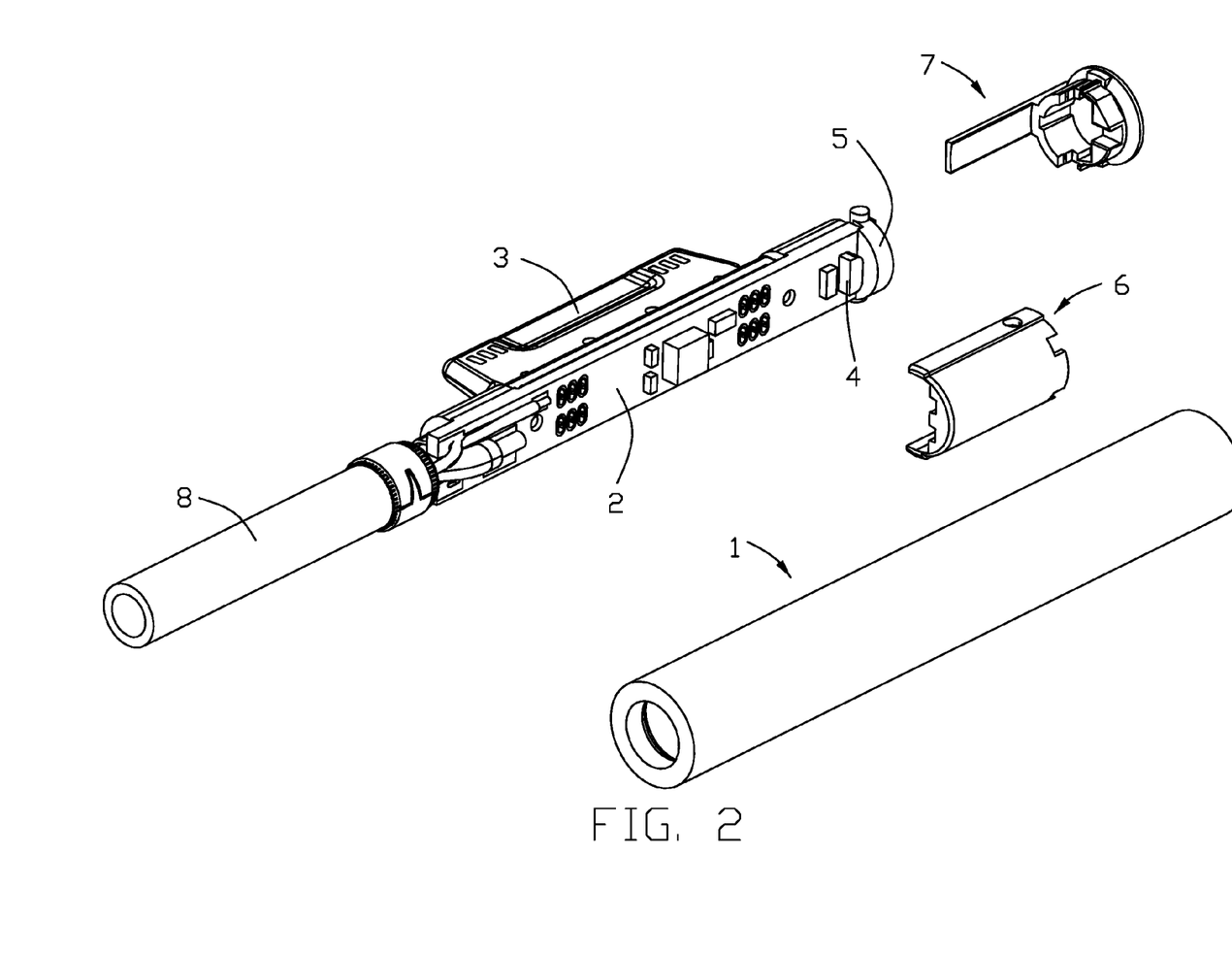
FIG. 2 is an exploded view of the cable assembly as shown in FIG. 1.
Figure 3:
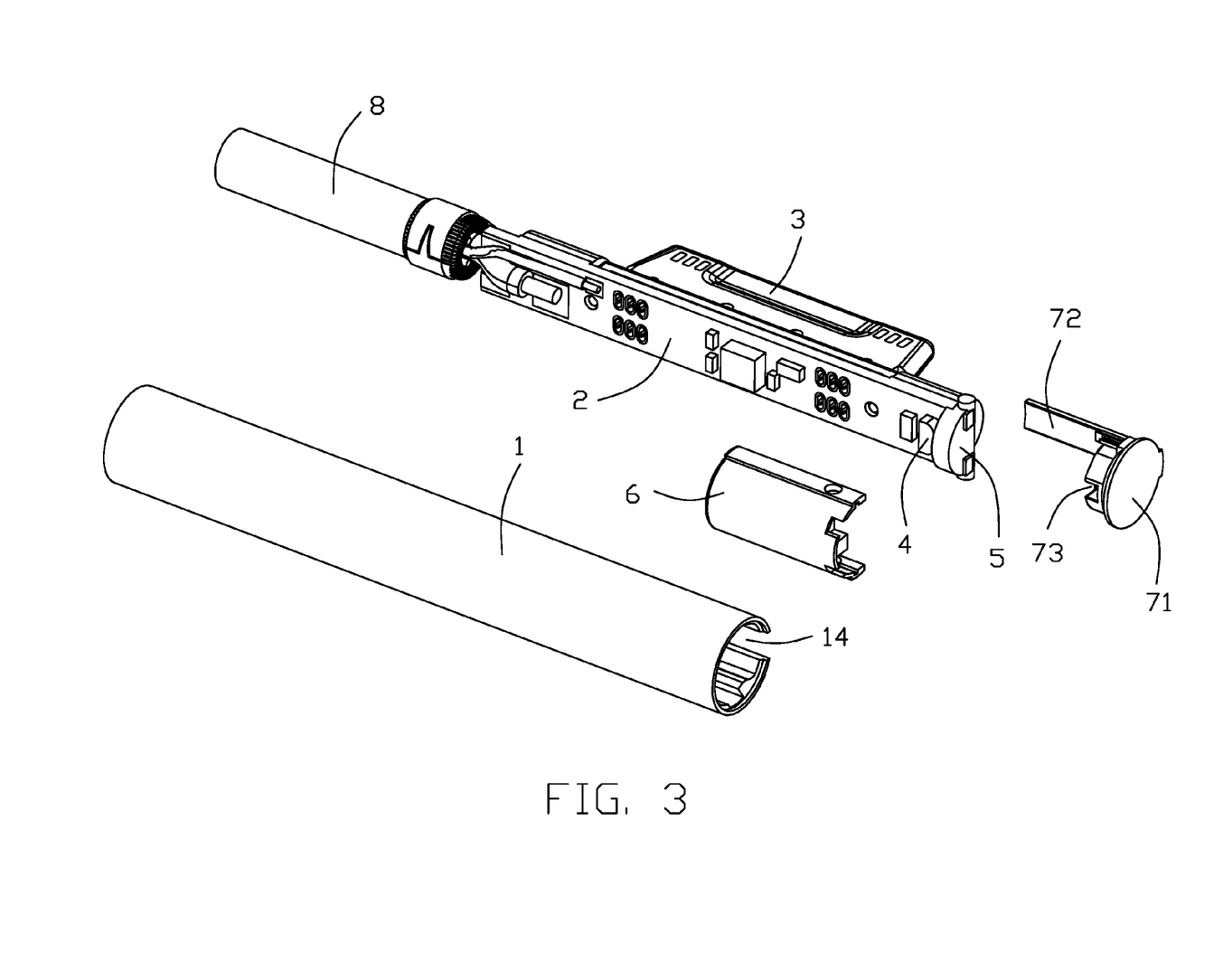
FIG. 3 is another exploded view of the cable assembly as show in FIG. 2.
Figure 4:
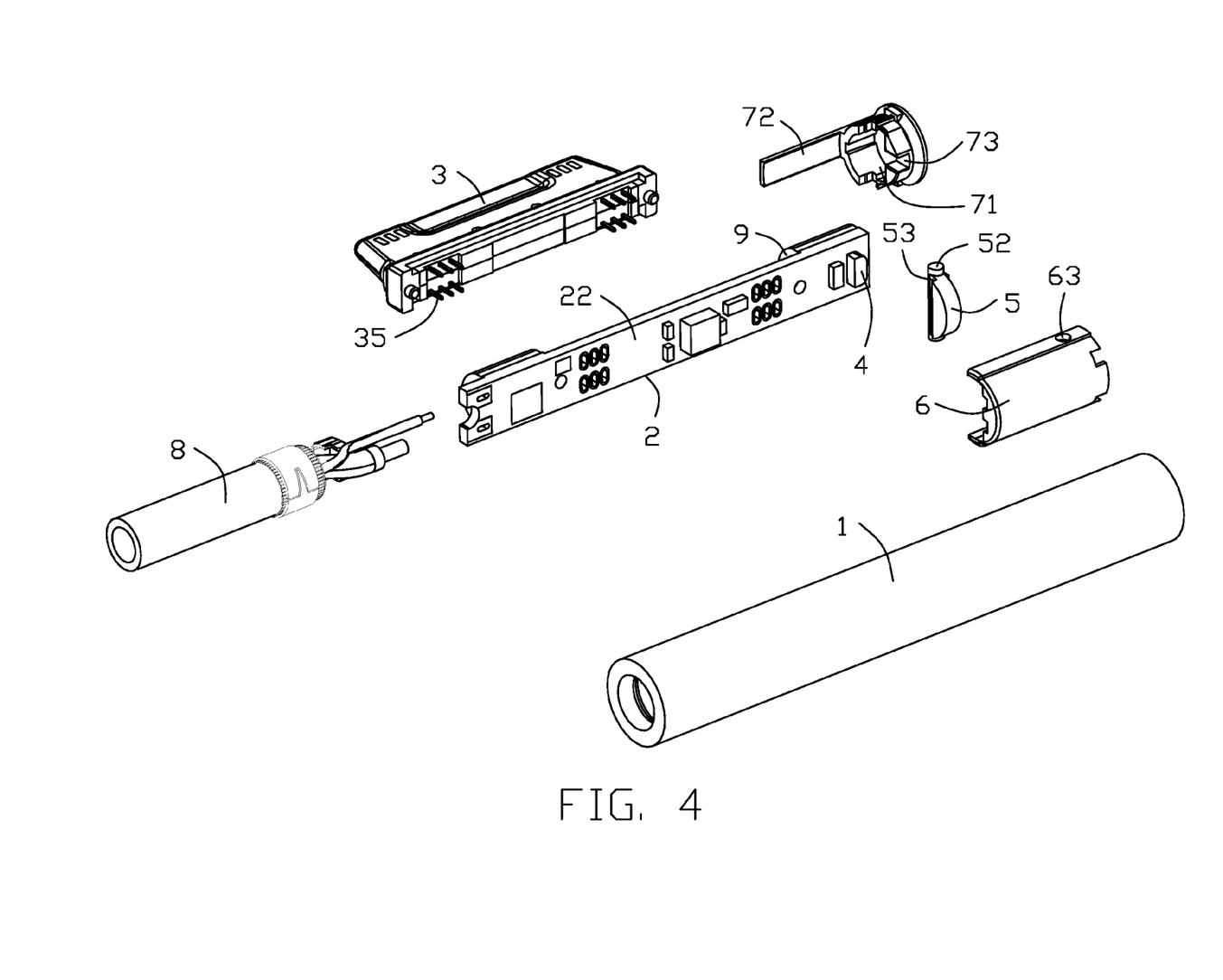
FIG. 4 is a further perspective exploded view of the cable assembly as shown in FIG. 2.
Figure 5:
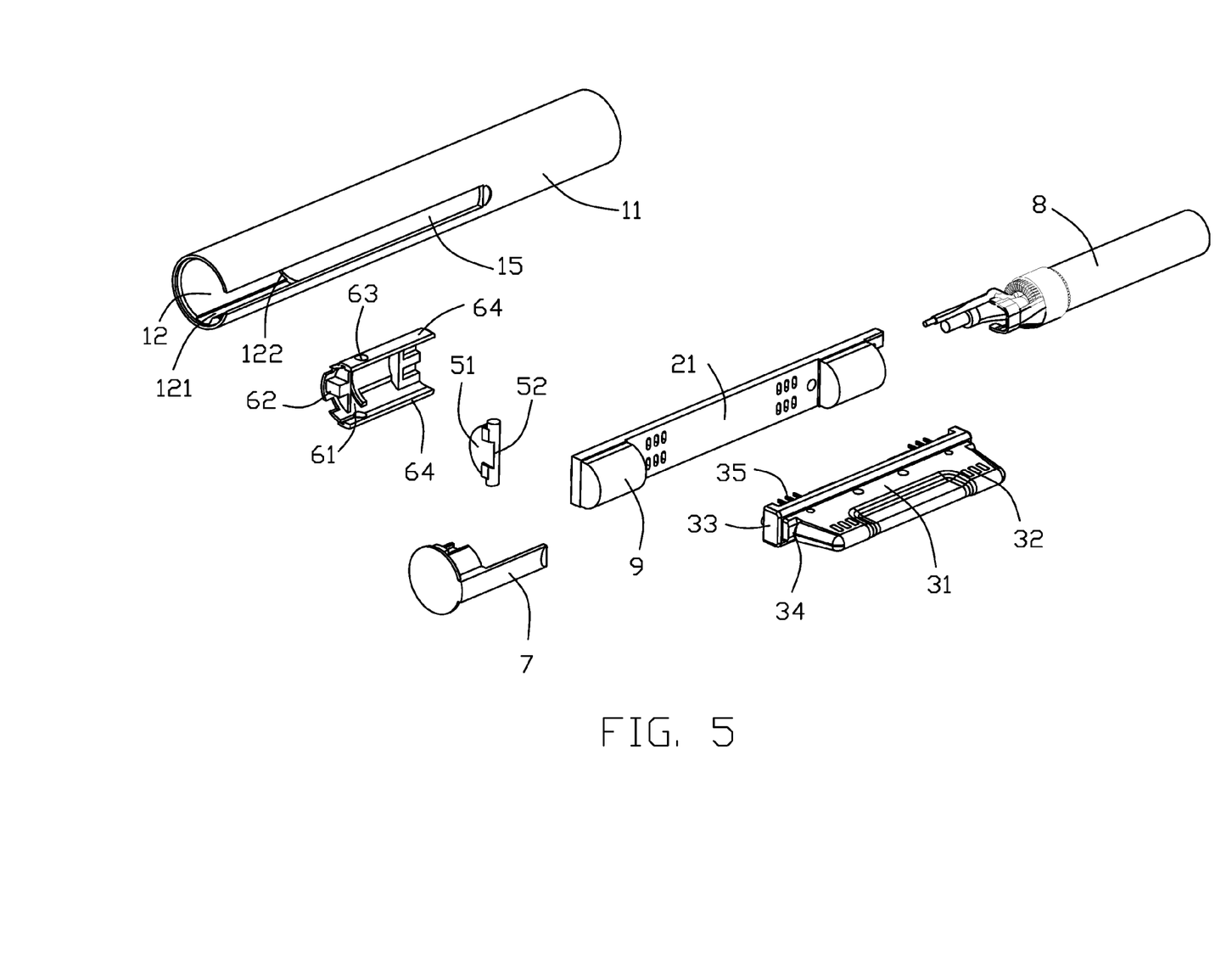
FIG. 5 is another exploded view of the cable assembly as show in FIG. 4.
Figure 6:
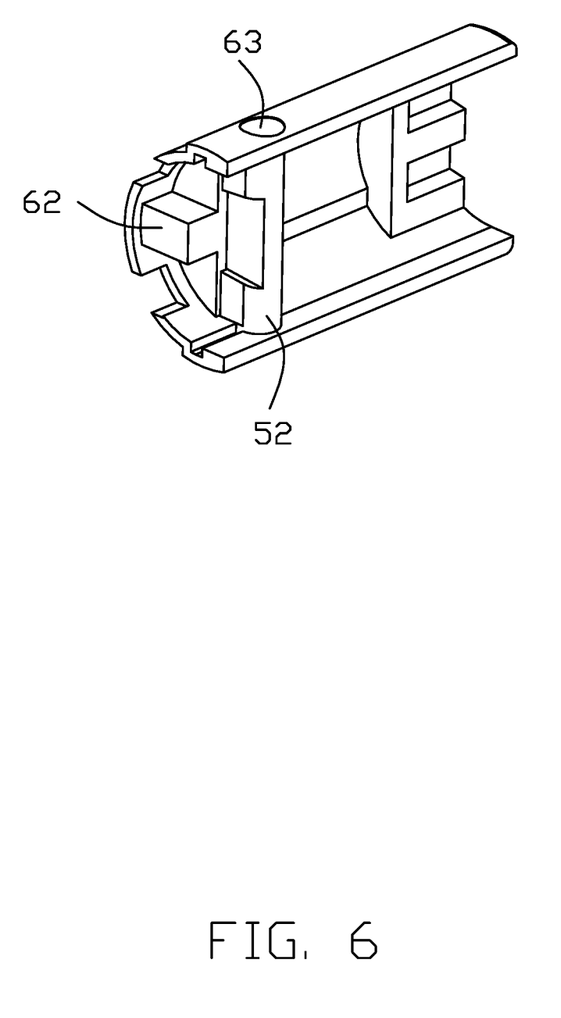
FIG. 6 is a perspective view of a light guide module.
Figure 7:
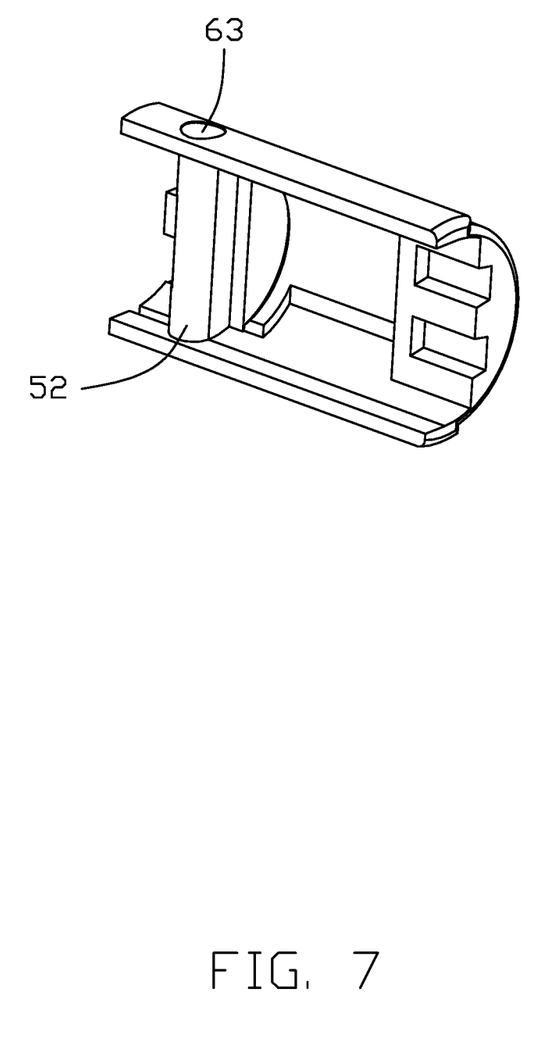
FIG. 7 is another perspective view of the light guide module as show in FIG. 6.
Figure 8:
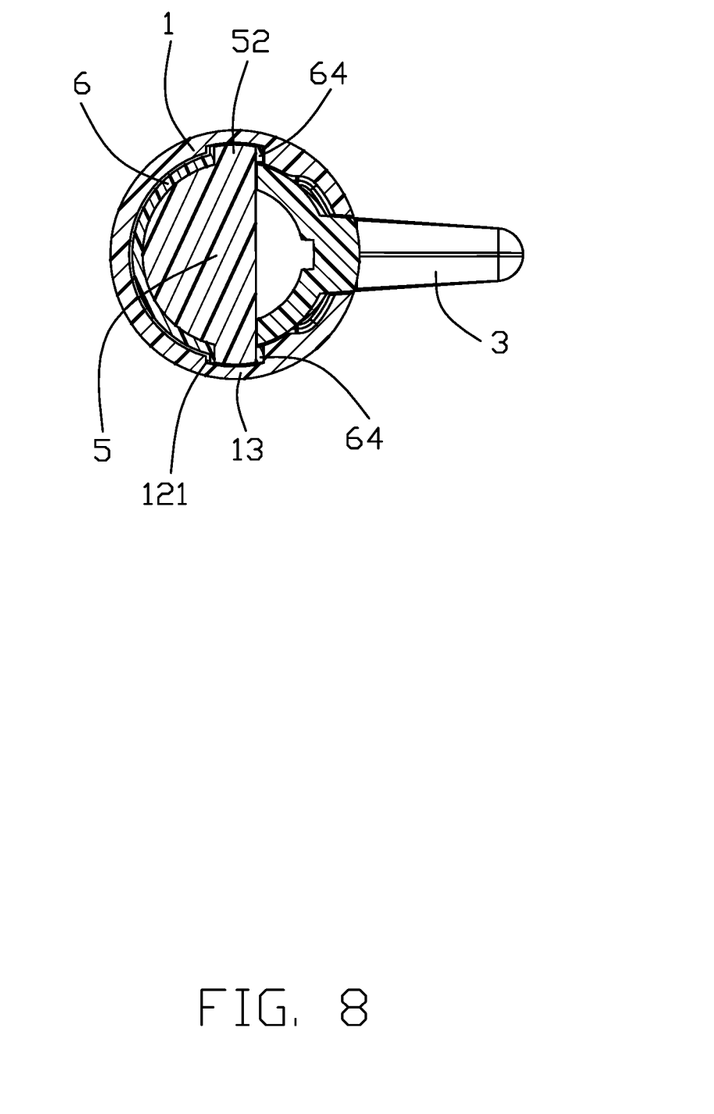
FIG. 8 is a cross section view of the cable assembly taken along line 8-8 in FIG. 1.
Figure 9:
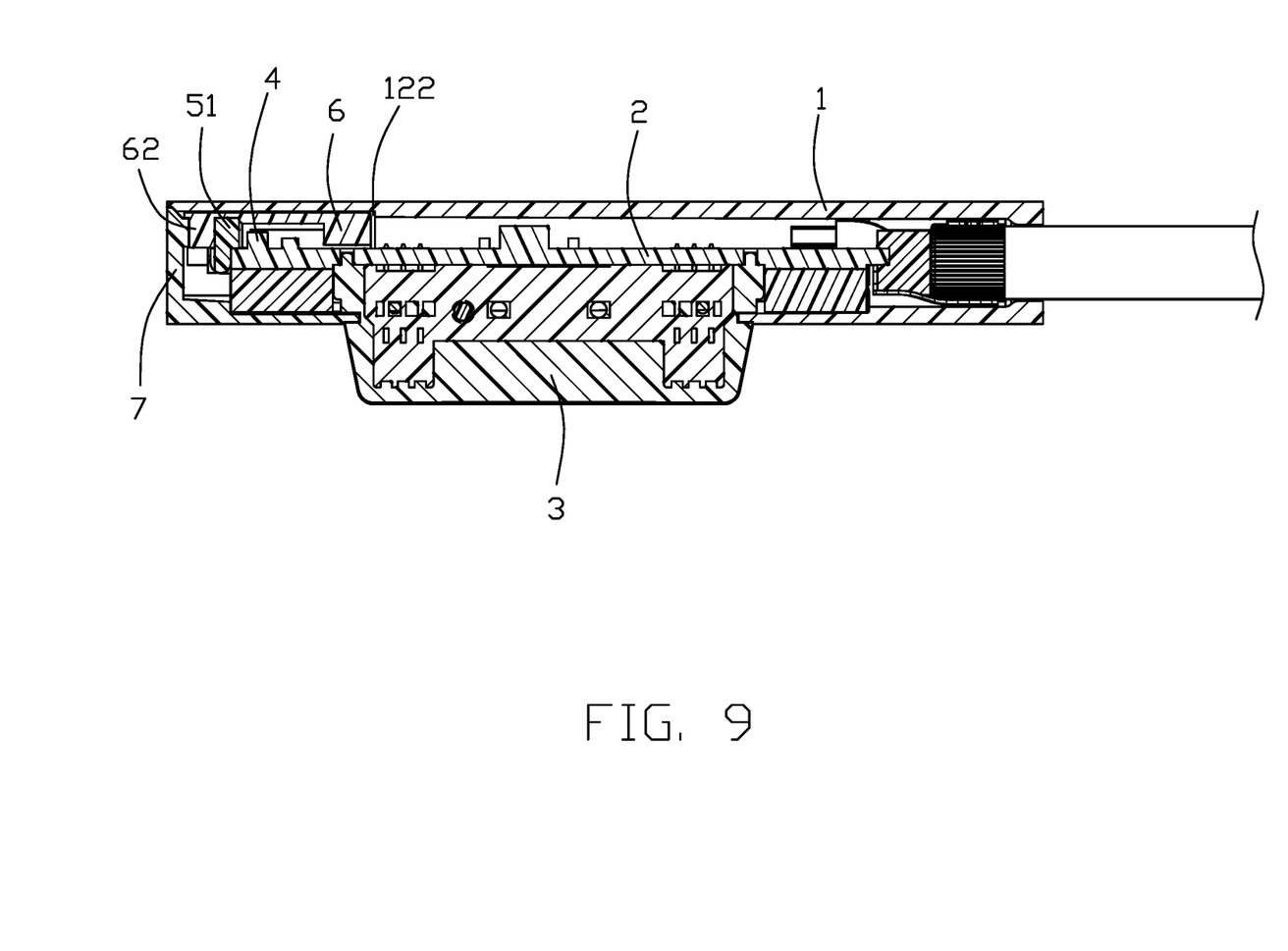
FIG. 9 is another cross-sectional view of the cable assembly taken long line 9-9 in FIG. 1.

The insulative housing 1 is cylindrical and includes a housing body 11, a receiving cavity 12 enclosed by housing body 11 and communicating with an exterior via an opening (not labeled) along the longitudinal direction, a light transmitting area 13 mounted on the housing body 11, a port 14 mounted on the front end of the housing body 11, and a channel 15 formed by extending port 14 backwards. Referring to FIG. 8, the thickness of the light transmitting area 13 is smaller than that of the other parts of the insulative housing 1.

The PCB 2 mounted in the receiving cavity 12 via the opening (not labeled) and includes an upper surface 21 and a lower surface 22 opposite to the upper surface 21. The mating member 3 is mounted on the upper surface 21 of the PCB 2. The light member 4 and light guide member 5 are mounted on the lower surface 22 of the PCB 2. The light member 4 and light guide member 5 are mounted on the PCB 2 away from one end of cable 8.

The mating member 3 includes a body 31 and a plurality of conductive contacts 35 fixed on the body 31. The body 31 includes a mating portion 32 for mating with a complementary connector (not shown) and a mounting portion 33 received in the insulative housing 1. The mating portion 32 defines a pair of recesses 34 adjacent to the mounting portion 33 and in two opposite sides of the mating portion 32, respectively. The conductive terminal 35 is punched and welded on the PCB 2.

The light member 4 is mounted on the front area of the lower surface 22. The light member 4 is a light emitting diode (LED). The light emitted by the light member 4 is transmitted to the light transmitting area 13 of the insulative housing 1 by the light guide member 5.

The light guide member 5 is opposite to the light transmitting area 13 and includes a light receiving portion 51 in semicircle shape and a light emitting portion 52 in cylindrical shape and a fixed portion 53 in stepped shape. The light receiving portion 51 is opposite to the light member 4, the light emitting portion 52 is opposite to the light transmitting area 13. The light receiving portion 51 is horizontally against the top side of the PCB 2 and the fixed portion 53 is abutted against the lower surface 22 of the PCB 2. The light receiving portion 51 receives the light from the light member 4. The light receiving portion 51 is transmitted to the light emitting portion 52, and finally, the circular cross section of the two sides of the outer end of the light emitting portion 52 is transmitted to the light transmitting area 13 of the insulative housing 1.

The shading member 6 and light guide member 5 are integrally formed into a light guide module, thereby reducing assembly time and reducing labor cost. Further, the shading member 6 is integrally formed with the light guide member 5 in both colors. The shading member 6 is coated with a light receiving portion 51, so that the light in the light receiving portion 51 is polymerized to the light emitting portion 52. The shading member 6 can prevent the light from the light member 4 wide divergence transmission and also protects the light guide member 5. The shading member 6 includes a groove 61 for receiving light guide member 5 in the inner side, a projection 62 extending at the front end of the groove 61 and a hole 63 in accordance with the column shape of the light emitting portion 52. In this embodiment, the light guide module is located beside the PCB in a transverse direction perpendicular to the longitudinal direction.

The front plug 7 is mounted on the insulative housing 1 to seal the port 14, and cooperated with the mating member 3 to seal the channel 15. The front plug 7 comprises a main portion 71 for being mated with the port 14, and an extending portion 72 extending from the main portion 71 with a free end interference fitting with one of the recesses 34 of the mating portion 32. The extending portion 72 is cooperated with the mating portion 32 to seal the channel 15. The front plug 7 defines a receiving portion 73 for receiving the projected portion 62 when the front plug 7 is covered with the insulative housing 1, and a latch slot (not shown) interference mating with the mounted portion (not shown) of the light guide member 5.

The cable 8 is connected to the back end area of the PCB 2.

The magnetic elements 9 are mounted on a first surface 21 of the PCB 2 and disposed at two opposite sides of the mating member 3, respectively. The magnetic elements 9 are magnets. The magnetic elements 9 are attracted with the mating connector to provide engagement force for the cable connector assembly 100 and the mating connector. The magnetic elements 9 are enclosed by insulative resin for being fixed on the PCB 2 by glue or other adhesive insulating material.

A method of making an electrical connector 100 comprises the steps of: the mating member 3 is welded on the PCB 2, and the welding can be formed by the connection of the punch welding or the surface welding. Welding the cable 8 with the PCB 2, the magnetic elements 9 is fixed on the upper surface 21 of the PCB 2, the light member 4 is pasted on the lower surface 22 of the PCB 2, the light guide member 5 and the shading member 6 are integrally formed into a light guide module 5 and positioned on the lower surface 22 of the PCB 2. The installation of the cable 8, the magnetic elements 9, the welding of the mating member 3, the light member 4 and the light guide module are not unique. Then, the insulative housing 1 is sheathed on the cable 8, so that the end of the channel 15 is balanced with the recesses 34 of the mating member 3. The front plug 7 is mounted to the front end of the insulative housing 1 and the port 14 of the insulative housing 1 is filled. Finally, the joint of the front plug 7 and the insulative housing 1 is bonded and fixed with glue. Thus, the entire cable assembly 100 has been assembled. It is noted that the shading member 6 forms a pair of opposite projections 64 received within the corresponding recesses 121 in an interior surface of the housing 1 so as to retain the light guide module in position within the receiving cavity 12 without rotation wherein the light guide member 5 extends into the projections 64. The housing 1 further includes a shoulder 122 to abut against the rear edge of the shading member 6 for preventing the shading member 6 from further inward moving. Understandably, the front plug 7 and the shading member 6 may be integrally formed as one piece, if necessary, in an alternate embodiment.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A cable assembly comprising:
   an insulating housing including a housing body defining a receiving cavity therein, and a light transmitting area disposed on the housing body;
   a printed circuit board (PCB) received in the receiving cavity;
   a mating member and a light member mounted on the PCB;
   a light guide member closely positioned around the PCB, the light guide member opposing the light transmitting area for transmitting light emitted by the light member to an outside of the insulative housing; and
   a shading member located beside the PCB and covering the light guide member; wherein
   the shading member securely retains the light guide member in position;
   wherein the light guide member includes a light receiving portion and a light emitting portion, the light receiving portion opposing the light emitting portion, the light emitting portion opposing the light transmitting area;
   wherein the light emitting portion is cylindrical, and the light emitted by the light member is transmitted to the light transmitting area through the light receiving portion and the light emitting portion;
   wherein the shading member includes a groove receiving the light guide member, a projection extending from the groove, and a hole conformed in shape to the light emitting portion.

2. The cable assembly as claimed in claim 1, wherein said shading member is fully enclosed in the receiving cavity.

3. The cable assembly as claimed in claim 1, wherein said light guide member is integrally formed with the shading member via an insert-molding process.

4. The cable assembly as claimed in claim 3, wherein the thickness of the light transmitting area is smaller than that of the other parts of the insulative housing.

5. A method of manufacturing a cable assembly, comprising the steps of:
   providing a transparent light guide member;
   providing a shading member with an opaque material;
   combining the light guide member and the shading member together as a one piece light guide module to have the shading member securely retain the light guide member thereto in position;
   providing a printed circuit board (PCB) with a mating member and a light member mounted thereon;
   providing a housing with a receiving cavity; and
   assembling said PCB and said light guide module into the receiving cavity;
   wherein the light guide module is closely located around said light member for light transmission;
   wherein the shading member includes a groove in which the light guide member is received;
   wherein said shading member includes a hole into which the light guide member extends and around which a light transmitting area is located to transmit light toward an outside of the housing.

6. The method as claimed in claim 5, wherein the shading member is integrally formed upon the light guide member via an injection molding process.

7. The method as claimed in claim 5, wherein said light guide module is assembled into the receiving cavity after the PCB is assembled into the receiving cavity.

8. A cable assembly comprising:
an insulative housing forming a receiving cavity extending along a longitudinal direction and having an opening to communicate the receiving cavity with an exterior along said longitudinal direction;
a printed circuit board assembled into the receiving cavity along said longitudinal direction via said opening;
a light member mounted upon the printed circuit board;
a light guide module assembled into the receiving cavity along the longitudinal direction via said opening, said light guide member including a light guide member closely facing the light member, and a retaining member securely retaining said light guide member thereto in position; and
a front plug sealing the opening and retaining the said light guide module in position with regard to the receiving cavity;
wherein said light guide module is retained in the receiving cavity and located beside the printed circuit board in a transverse direction perpendicular to said longitudinal direction;
wherein said retaining member forms at least one projection to be received in a corresponding recess formed in an interior surface of the housing so as to retain the retaining member in position without rotation;
wherein said retaining member includes a projecting portion received in a receiving portion formed in a backside of the front plug so as to prevent relative rotation between the retaining member and the front plug.

9. The cable assembly as claimed in claim 8, wherein said light guide member is integrally embedded within the retaining member.

10. The cable assembly as claimed in claim 8, wherein said retaining member forms a rear edge abutting against a shoulder formed upon an interior surface of the housing so as to prevent further inward movement of the retaining member along the longitudinal direction.

11. The cable assembly as claimed in claim 8, wherein said light guide member is located in front of a front edge of the printed circuit board which is close to the opening along said longitudinal direction.

12. The cable assembly as claimed in claim 8, wherein the mating member and the light guide module are respectively located by two opposite sides of the printed circuit board in the transverse direction.

* * * * *